United States Patent [19]

Force

[11] Patent Number: 4,804,694

[45] Date of Patent: Feb. 14, 1989

[54] PROCESS FOR PREPARATION OF HIGH SOLIDS CONCENTRATED LATEX

[75] Inventor: Carlton G. Force, Mt. Pleasant, S.C.

[73] Assignee: Westvaco Corporation, New York, N.Y.

[21] Appl. No.: 121,402

[22] Filed: Nov. 16, 1987

[51] Int. Cl.[4] .................................................. C08J 3/00
[52] U.S. Cl. ..................................... 523/335; 524/575
[58] Field of Search .......................................... 523/335

[56] References Cited

U.S. PATENT DOCUMENTS

| | | | |
|---|---|---|---|
| 2,444,801 | 7/1948 | Arundale | 528/488 |
| 3,049,502 | 8/1962 | Howland | 523/335 |
| 3,551,370 | 12/1970 | Dalton | 523/335 |
| 3,915,909 | 10/1975 | Schnoring | 523/335 |

FOREIGN PATENT DOCUMENTS 0859699  9/1959  United Kingdom ................ 523/335

Primary Examiner—Joseph L. Schofer
Assistant Examiner—Peter D. Mulcahy
Attorney, Agent, or Firm—Terry B. McDaniel; Richard L. Schmalz

[57] ABSTRACT

A process for agglomerating synthetic rubber latexes to obtain rubber particles having large average particle sizes comprising the steps of mixing with a synthetic rubber latex having primary or secondary carboxyl groups at the particle surfaces of the latex, an inorganic potassium salt in a concentration in the latex of at least about 0.50 normal to agglomerate the particles, and separating the agglomerated rubber particles from the liquid of the latex.

Separation of the agglomerated rubber particles may be accomplished by gravity or centrifugation when the potassium ion concentration in the latex is at least about 1.15 normal.

10 Claims, No Drawings

PROCESS FOR PREPARATION OF HIGH SOLIDS CONCENTRATED LATEX

This invention relates to a process for preparing latex, and more particularly, to an improved process for preparing a synthetic rubber latex having a large average particle size and distribution of particle sizes which enables the latex to be concentrated to a high solids content at relatively low viscosity, and to the resulting improved synthetic rubber latex products produced by such process.

BACKGROUND OF THE INVENTION

In many industrial processes and applications employing synthetic rubber latex, the ability to obtain a mechanically stable latex composed of specific particle sizes and size distributions is of great importance. For many commercial applications, such as in the manufacture of foam rubber, the higher the latex solids content and the lower the viscosity, the more desirable is the synthetic rubber latex composition. Latices for coating and adhesive applications show optimum properties when their particle size is near 200 nanometers (nm) in diameter. At much above 200 nm, the surface tension forces developed in drying water from the polymer particles is not adequate to produce rapid coalescence into a continuous film. These surface tension forces increase for smaller polymer particle sizes; however, the smaller the sizes, the lower the maximum solids which can be achieved before the latex goes from water-like viscosity to a thick gel over an increase in solids of no more than 1% or 2%.

The larger a latex particle size, the higher the solids it can achieve before becoming too viscous for satisfactory flow. A broad particle size distribution extending from less than one hundred nm to several hundred nm enhances the solids achievable until they approach a 70% solids region. Applications of synthetic rubber latex in foam rubber articles and carpet backing requires high solids content to prevent syneresis. Such articles must coalesce rapidly during drying to optimize cushion characteristics in the finished product.

Latex particles of large particle sizes are also required for other applications, such as production of high-impact strength and hard polymers. If a hard, brittle polymer receives a sharp blow, it will be apt to shatter unless latex particles are randomly dispersed in the middle polymer continuous phase to absorb the energy and stop the crack.

Emulsifiers used to coat the latex particles and maintain the colloidal stability of the emulsion particles in suspension are sometimes fatty acid salts, the soap ions of which are absorbed to the latex particles to produce electrically negative surfaces. These charges attract positive cations (counter ions) into the aqueous region surrounding the particles to neutralize the absorbed soap ions on the latex particles and produce a diffuse electrostatic double layer about each latex particle. If these diffuse double layers are compressed sufficiently close to the particles by a high concentration of counter ions in the system, coagulation of the latex will occur. Thus, without satisfactory electrostatic stabilization, the latex will irreversibly coagulate or "preflock" during handling and storage prior to use. On the other hand, if the concentration of rubber particles within the system is sufficiently great that their electrostatic double layers are forced close to each other, a secondary electroviscous effect occurs causing interaction between neighboring particles which produces a high viscosity gel. Dilution of the system or compression of the double layers somewhat with a little additional electrolyte restores such a latex to its original viscosity and its behavior characteristics.

Latex solids approaching 70% are generally achieved by a blend of about 73.5% by volume fraction of larger particles of the order of 200 nm–250 nm diameter and about 26.5% of small particles one-half or less the size of the large ones. Such a ratio allows a maximum solids compaction or packing before the secondary electroviscous effect occurs.

The existing technology used to produce latexes of specific particle size characteristics and distribution for these and other end-use applications is sophisticated and somewhat costly. The particle size obtained in a latex, in emulsion polymerization, usually ranges from about 40 nm up to about 120 nm in diameter. The emulsifier for the latex and the characteristics of the polymerization system utilized govern the specific size which is achieved. If 200 nm diameter particles are to be produced by agglomeration, many 120 nm particles must coagulate the coalesce together. Sometimes large relatively monodisperse latexes are produced by utilizing the original latex as seed, adding more monomer, sometimes in a semi-continuous manner, and polymerizing to the desired size. More emulsifier is also required to maintain colloidal stability of the larger particles. However, care must be exercised that the new emulsifier never reaches a concentration near its critical micelle concentration in the aqueous phase, otherwise, new particles will be generated to give small particle sizes along with the desired 200 nm particles.

Currently, there are several methods used to commercially agglomerate latices to a desired particle size and broad size distribution required for their end-use applications. One such agglomeration process involves freezing the latex under carefully controlled temperature conditions, after which it is melted, or thawed, and heat concentrated at atmospheric pressure. Such freezing and thawing processes are described in U.S. Pat. Nos. 2,993,020 and 3,296,178.

Another process for producing synthetic rubber latexes of increased particle size involves mechanical agglomeration under precise conditions of shear followed by atmospheric pressure heat concentration.

A third method currently employed to commercially agglomerate and control particle sizes of synthetic rubber latexes involves agglomerating during emulsion polymerization of the latex in a system with only a small amount of emulsifier present. When the latex particles have grown until their surfaces are sufficiently starved of emulsifier for the particles to become colloidally unstable, shear mixing of the latex particles partially agglomerates the same. The latex may be kept from totally coagulating by quickly adding sufficient emulsifier to again produce a colloidally stable system precisely at the moment when the emulsifier should be added to achieve satisfactory product. Sometimes shear conditions are such that agglomeration reduces the particle surface area sufficiently so the original emulsifier present can saturate the particle surfaces and prevent coagulation. The agglomerated latexes may be then further polymerized to produce the final product. Since the rate of polymerization is dependent on the number of rubber particles in the system, polymerization is generally much slower after agglomeration than before. Methods of polymerization agglomeration of latex systems are disclosed in U.S. Pat. Nos. 3,080,334; 3,318,831; and 3,607,807.

Natural rubber latex and synthetic rubber latexes may be creamed, i.e., separated into a rubber rich cream portion and a serum portion poor in rubber, by the addition thereto of a vegetable mucilage, such as an alginate, locust bean gum, Irish moss, and the like. Although the creaming method of concentration works well with natural rubber latex because the particle size of the latex is quite large and because the difference in the density between the rubber and media is about 0.08 gm per cc, synthetic rubber latexes cannot be concentrated readily to high solids content by creaming because the particle size is much smaller and the density difference is also smaller than that of natural rubbers.

U.S. Pat. Nos. 2,444,689 and 2,444,801 disclose methods of increasing the size of synthetic latex particles by treating with salts of certain inorganic monovalent cations, organic amine salts, or organic acids in the proper concentrations. In particular, U.S. Pat. No. 2,444,801 discloses that inorganic salts, such as ammonium, sodium, potassium, and lithium salts, in high concentrations cause agglomeration of rubber particles in synthetic latexes to such an extent as to coagulate the rubber latexes. The patent states that treatment of synthetic rubber latexes containing 20 to 30 percent solids with solutions of the inorganic salts at low concentrations, i.e., at or below 7 (seven) weight percent makes it possible to obtain an enlargement of latex particle size without excessive coagulation, and at the same time, increase the density of the media. Such an increase in particle size is stated to facilitate creaming to concentrated latexes containing approximately 50% total solids or higher.

Although the above-mentioned processes of agglomeration of synthetic rubber latexes are commercially employed, they involve relatively complicated and expensive procedures requiring carefully controlled conditions to produce the end-products desired.

BRIEF OBJECTS OF THE PRESENT INVENTION

It is an object of the present invention to provide an improved method of agglomeration of synthetic rubber latexes to obtain latexes having a large average particle size, and, under certain conditions, distribution of particle sizes to enable the latex to be concentrated to a high-solids content at relatively low viscosity.

It is another object to provide an improved method of producing synthetic rubber latexes of large average particle size, and, under certain conditions, distribution which is believed more economical and efficient than those processes practiced in prior art.

SUMMARY OF THE INVENTION

The process of the present invention comprises the steps of agglomerating a polymerized synthetic rubber latex to large particle size, i.e., above about 240 nm, by mixing with a synthetic rubber latex containing primary or secondary carboxyl groups a controlled large amount of a potassium salt above about 0.5N (normal) to achieve an ultimate potassium ion concentration in the aqueous phase of the latex greater than what has been understood to be the critical coagulation concentration of the potassium ion in the latex while agitating the mixture to produce agglomeration of the particles and increase particle size without coagulation of the latex. The primary or secondary carboxyl groups are located adjacent the rubber particle surfaces and may be provided by their presence in the particular rubber particles selected, or by their presence in a selected emulsifier for the latex.

After the initial agglomeration, the potassium salt interacts with the particles present to cause the particles to assemble in their optimum, closely packed constructual configuration into a secondary reversible structure of much larger size. This allows the production of agglomerated synthetic rubber latexes containing above about 50% by weight latex solids at average particle sizes of 240 nm diameter or more.

As used herein, the term "critical coagulation concentration" is that concentration of potassium ion in combination with synthetic rubber latex above which coagulation would normally occur at a relatively rapid rate. In general, critical coagulation concentration is a point of intermediate coagulation, which occurs between the limits imposed by slow coagulation and rapid coagulation. The rate at which intermediate coagulation takes place is dependent upon electrolyte concentration in the sol. Critical coagulation concentration for various ions are developed and described by Tezak, Miatijevic, and Schulz in an article appearing in the *Journal of Physics and Colloidal Chemistry* Volume 55, page 1557, published 1951, and disclosure of this publication is included herein by reference. The critical coagulation concentration of potassium ion in synthetic rubber latexes is generally considered to be around 0.3N potassium ions in the latex composition.

Excess water may be removed from the agglomerated latex by evaporation, or when sufficient electrolyte, such as KCl, is added to increase the density of the water phase, the excess water may be separated easily from the latex by gravity or mild centrifugation as a clear layer which can be decanted from the high solids rubber phase, eliminating the need for more complicated processes and steps as described in the prior art. For styrene butadiene latexes, gravity and centrifugal separation can take place readily when the potassium ion concentration in the latex reaches about 1.15 normal or greater.

Broad-size distribution systems for maximum solids also can be produced in two ways. One of these is by blending narrow distribution latexes of different average sizes. The other is by utilization of the proper concentration of potassium electrolyte salt for the agglomeration. These individual narrower distribution latexes can be produced according to the amount of potassium emulsifier which is added to the latex prior to blending with the high-potassium ion concentration of electrolyte salt and the degree of agitation utilized during the blending. Generally, the higher concentrations of potassium electrolyte salt produce large latexes of narrower particle size distribution. Potassium electrolyte salt concentrations somewhat above 0.5 normal tend to directly produce broader size distribution for maximum solids.

DETAILED DESCRIPTION OF PREFERRED EMBODIMENTS

The present invention is directed to a method of increasing the particle size of synthetic rubber particles in a synthetic latex, such as obtained by the polymerization of acrylic, styrene butadiene, nitrile, polybutadiene, or noeprene rubbers, having a primary or secondary carboxyl group present in the latex particle or in the emulsifier for the particle, by combining with the latex under mixing and agitation conditions an inorganic potassium salt in an amount in which the potassium ion is in a concentration of greater than about 0.5 normal in the mixture to agglomerate the latex solids to permit achievement of a solids content greater than 50% in the final product without coagulation of the synthetic rubber latex.

Although the mechanism by which the potassium ions are believed to produce the unique behavior of agglomeration without coagulation is not clearly understood, it is speculated that the potassium interacts with readily available carboxyl groups to created colloidally stable particles. In addition, the potassium salt seems to develop a reversible network between the particles, creating clusters that may contain enough individual particles so that the cluster size shows the sedimentation and Brownian motion properties expected from particles having a diameter greater than a micron. Cluster formation appears to incorporate all of the rubber particles in the system in a manner such that they cannot come into direct contact with each other to further agglomerate or form coagulation.

Sedimentation characteristics of latexes produced by the potassium agglomeration process allows use of the conventional centrifugation method of concentration of synthetic latexes long used for the much larger particle size natural rubber latexes. Centrifuge serum containing much of the potassium salt and any residual latex can be recycled into future batches to recover all of the rubber and economize on the potassium salt requirements.

The unique phenomenon of agglomeration without coagulation of the latex particles to maintain a stabilized colloidal system appears to be limited to the potassium ion among monovalent ions, since sodium ions do not provide agglomeration and stabilization at high concentration. The latexes agglomerated with potassium ions remain anionic making their utilization compatible with current technology and end-use. p Surprisingly, it has been found that in the particular combination of an inorganic potassium salt with the latex particles wherein the primary or secondary carboxyl groups are present in the particle or in the emulsifier, the potassium ion concentration may be increased above the critical coagulation concentration of the ion heretofore believed to cause coagulation, with agglomeration of the synthetic latex particles into large particle size without coagulation of the same. Thus, the agglomerated particles may be separated at high solids concentration from the serum or aqueous phase by gravity or centrifuge methods. The large particle sizes may thus be easily separated without the need of a creaming agent, evaporation, freeze and thaw, or high-pressure agglomeration methods heretofore employed in the production of such large particle size polymers.

EXAMPLE

The invention may be illustrated by way of the following example. 81.5 grams of 36% solids styrene butadiene rubber latex containing 3% Westvaco 1480 emulsifier (oleic acid emulsifier) based on the rubber was diluted to 114.5 grams to produce 25.6% solid latex for agglomeration. Potassium chloride was dissolved in distilled water to a concentration of 3.02 normal (225 grams of KCl/liter of solution), and pumped to deliver 33.6 grams of solution per minute to a Spiral Motionless Mixer, such as manufactured by Kinex. The latex composition is pumped into the mixer and agitated and mixed with the incoming potassium salt stream at a flow rate of about 109 grams per minute. The white colored agglomerated latex emerging from the Spiral Motionless Mixer was collected in a tared beaker. The potassium chloride and latex pumps were stopped when the last of the 114.5 grams of latex was pumped into the mixer at a time elapsed of 63 seconds.

From the pumping time, weights, and solids measurements obtained during this agglomeration, it was calculated that 35.3 grams of 3.02N KCl solution was pumped together with 103.8 grams of 25.6% latex to produce the 139.1 grams of agglomerated latex having a potassium chloride concentration of 0.95N.

139.1 grams of agglomerated latex collected in the tared beaker was transferred to a 250 ml separatory funnel.

Since separation doesn't occur until the KCl concentration is at least between about 1.15 and 1.20 normal, depending upon the temperature, to increase density of the aqueous phase to permit separation, 13 ml of 3.25N KCl solution was added to the latex in the separatory funnel to raise the normality to 1.20. The latex was allowed to separate by gravity. The lower serum phase drawn off weighed 62.05 grams, and contained a total solids content of 11.5%. The particle diameter of the dispersed rubber in the lower phase was 116 nm with a standard deviation of 24 nm by photon correlation spectroscopy.

Into two centrifuge tubes were drawn two 12 ml samples of upper latex fraction in the separatory funnel. These were centrifuged one hour at 650 RPM in a Clay Adams Safety Head laboratory centrifuge. The separated latex had a solids content of 71% and 69.7% in the two 12 ml samples, respectively. The bottom of each centrifuge tube contained about 6.8 ml of clear serum.

The following table illustrates calculated results of a number of laboratory examples where amounts of potassium ion salts are mixed under condition of the foregoing example with styrene butadiene rubber latexes containing an oleic acid emulsifier to produce centrifuged agglomerated latex compositions containing latex solids in the sizes and amounts indicated.

TABLE I

| Agglomeration Results Using About 3.0 N KCl Additive | | | | |
|---|---|---|---|---|
| KCl Pumped (g) | KCl Normality in Latex | KCl Added After Agglom. And Before Separation (g) | Centrifuged Latex Solids w/o KCL (wgt. %) | Particle Diameter (nm)* |
| 12.8 | 0.49 | 9.168 | 48.5 | 240 |
| 23.4 | 0.65 | 6.62 | 59.5 | 276 |
| 32.4 | 0.76 | 6.84 | 66.9 | 227 |
| 29.9 | 0.94 | 4.12 | 72.1 | 242 |
| 35.3 | 0.95 | 3.15 | 67.8 | 257 |
| 38.6 | 1.08 | 2.91 | 68.9 | 258 |
| 54.1 | 1.21 | — | 60.2 | 296 |
| 69.7 | 1.39 | — | 49.6 | 273 |
| 64.5 | 1.43 | — | 53.3 | 276 |
| 71.0 | 1.60 | — | 47.1 | 277 |

*(as measured by photon correlation spectroscopy)

From the foregoing results presented in Table I, it can be seen that the addition of at least about 0.5 normal potassium salt to a synthetic rubber latex containing a primary or secondary carboxyl group at the surface of the particles when mixed and agitated produces agglomerated latexes which may be separated into latex solids portions containing more than about 50% solids latex by weight and latex particle diameters of about 227 nm or greater, and that such agglomerated latexes may be separated effectively by gravity or centrifugation when the potassium ion concentration reaches about 1.15 normal or greater in the latex.

Surprisingly, by control of the amount of potassium salt employed and use of the same with rubber latexes containing primary or secondary carboxyl groups at the particle surfaces above large particle size latexes can be produced without undesired coagulation, as heretofore has been thought.

That which is claimed is:

1. In a process for increasing the particle size of synthetic rubber particles in a synthetic rubber latex comprising mixing an inorganic potassium salt with a synthetic rubber latex, the improvement of agglomerating the latex solids to a degree which will permit a solids concentration of greater than about 50% without coagulation of the agglomerated solids by employing an amount of the inorganic potassium salt in which the potassium ion is in a concentration of greater than about 0.5 normal in the latex and employing a synthetic rubber latex having a primary or secondary carboxyl group present in the latex.

2. A process as defined in claim 1 wherein the synthetic rubber latex is selected from the group consisting of acrylic, styrene butadiene, nitrile, polybutadiene, and neoprene rubbers.

3. A process as defined in claim 1 wherein the concentration of potassium ion in the latex is at least about 1.15 normal, and including the step of separating the latex solids from liquid of the latex by centrifugation.

4. A process as defined in claim 1 wherein the concentration of the potassium ion in the latex is at least about 1.15 normal, and including the step of separating the latex solids from liquid of the latex by gravity.

5. A process as defined in claim 1 wherein the average particle diameter of the agglomerated rubber solids is at least about 227 nanometers.

6. A process as defined in claim 1 wherein the synthetic rubber is a styrene butadiene polymer, and wherein the latex contains an oleic acid emulsifier.

7. A process as defined in claim 1 wherein the rubber particles contain the primary or secondary carboxyl group.

8. A process as defined in claim 1 wherein the latex contains an emulsifier having the primary or secondary carboxyl group present therein.

9. The product produced by the process of claim 1.

10. The product produced by the process of claim 3.

* * * * *